United States Patent [19]
Kelley

[11] Patent Number: 5,493,934
[45] Date of Patent: Feb. 27, 1996

[54] TEARDROP SHAPE SLUG FOR CABLE ASSEMBLY

[75] Inventor: Dixon L. Kelley, New Baltimore, Mich.

[73] Assignee: Teleflex Incorporated, Plymouth Meeting, Pa.

[21] Appl. No.: 281,465

[22] Filed: Jul. 27, 1994

[51] Int. Cl.$^6$ ................................ F16C 1/22; F16C 1/10
[52] U.S. Cl. .................. 74/502.6; 74/500.5; 74/501.5 R; 74/502.4; 403/209; 403/213
[58] Field of Search ...................... 74/502.4, 502.6, 74/500.5, 501.5 R; 403/209, 213, 27, 220

[56] References Cited

U.S. PATENT DOCUMENTS

| | | | |
|---|---|---|---|
| 219,860 | 9/1879 | Healey | 403/209 |
| 1,058,511 | 4/1913 | Wood | 403/213 |
| 1,771,131 | 7/1930 | Manners | 403/209 |
| 2,183,546 | 12/1939 | Colgrove | 403/209 |
| 3,148,423 | 9/1964 | Anspach | 403/209 |
| 3,240,526 | 3/1966 | Schopf et al. | 403/213 X |
| 3,699,950 | 10/1972 | Humphrey et al. | 430/213 X |
| 3,846,033 | 11/1974 | Smollinger | 403/220 |
| 4,088,040 | 5/1978 | Ross-Myring | 74/489 X |
| 4,624,155 | 11/1986 | Wing | 74/591.5 R |
| 5,142,935 | 9/1992 | Carr | 74/502.6 |
| 5,165,298 | 11/1992 | Shier et al. | 74/502.6 |
| 5,222,413 | 6/1993 | Gallas et al. | 74/502.4 |
| 5,394,768 | 3/1995 | Hallock | 74/502.6 |

FOREIGN PATENT DOCUMENTS

| | | | |
|---|---|---|---|
| 1096590 | 6/1955 | France | 74/502.4 |
| 1327445 | 4/1963 | France | 74/502.6 |
| 2532381 | 3/1984 | France | 74/502.4 |
| 2-134409 | 5/1990 | Japan | 74/502.6 |
| 3-267532 | 11/1991 | Japan | 74/502.6 |
| 225838 | 5/1943 | Switzerland | 74/502.4 |

*Primary Examiner*—Vinh T. Luong
*Attorney, Agent, or Firm*—Howard & Howard

[57] ABSTRACT

A remote control cable assembly (10) includes a conduit (12) with a core element (24) slidably supported in the conduit (12). Slugs (30, 32) are die cast on each end of the core element (24) for connection to various controlling and controlled devices to transmit tensile forces therebetween. At least one slug (32) is formed with a teardrop shape having a spherically rounded head (34) and a frustum tail (36). The end (28) of the core element (24) is embedded within the slug (32). The twisted strands of the core element (24) are fanned over a segment (50) and embedded within the slug (32) to improve adhesion. During the die casting formation process, a sprue (52) injects molten zinc into a die cavity (44) near a truncated tip (38) of the frustum tail (36). The sprue (52) location and angle (I) decreases the possibility of unwanted core element (24) movement during the pressurized injection of molten zinc thereby improving cable assembly tolerances. Also, the sprue (52) location improves adhesion between the core element (24) and the zinc by immediately conducting the flow of molten zinc into the fanned and untwisted segment (50) of cable strands.

8 Claims, 2 Drawing Sheets

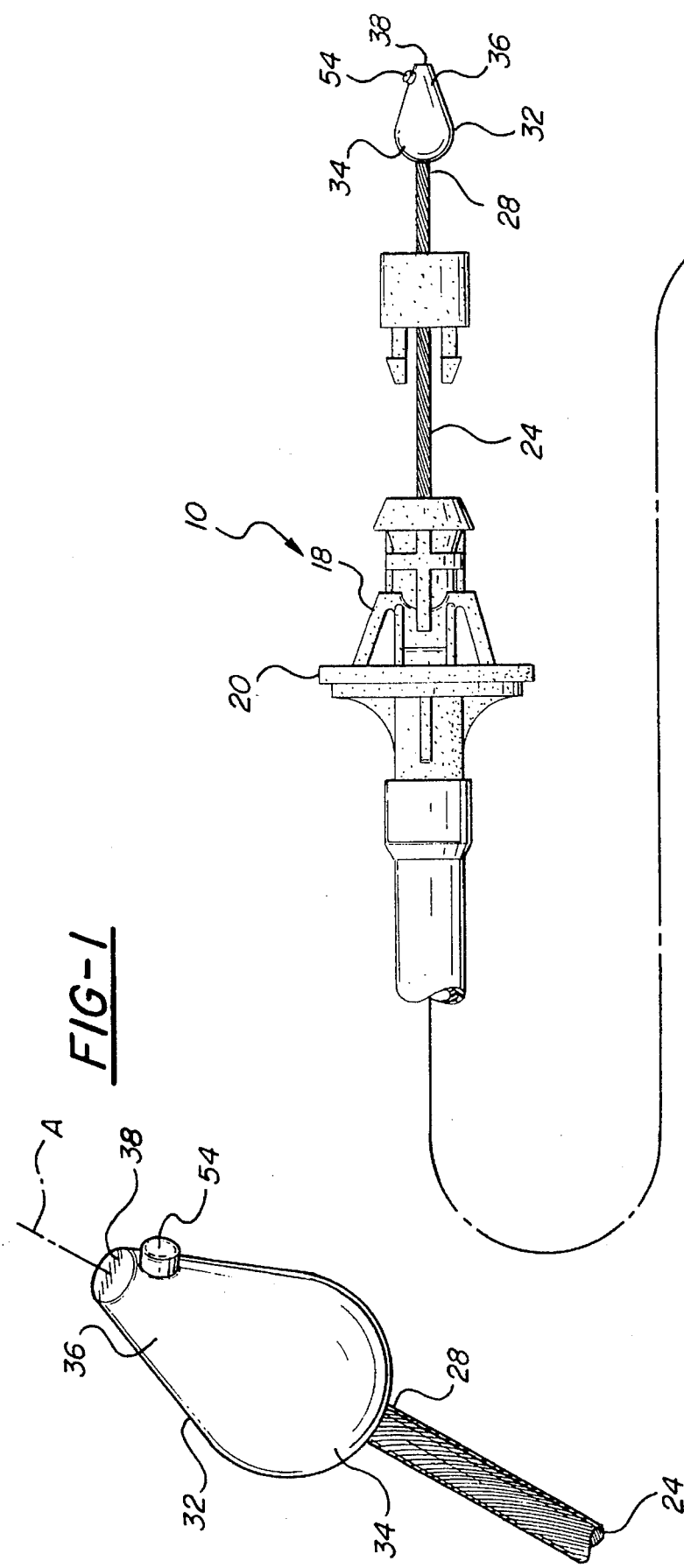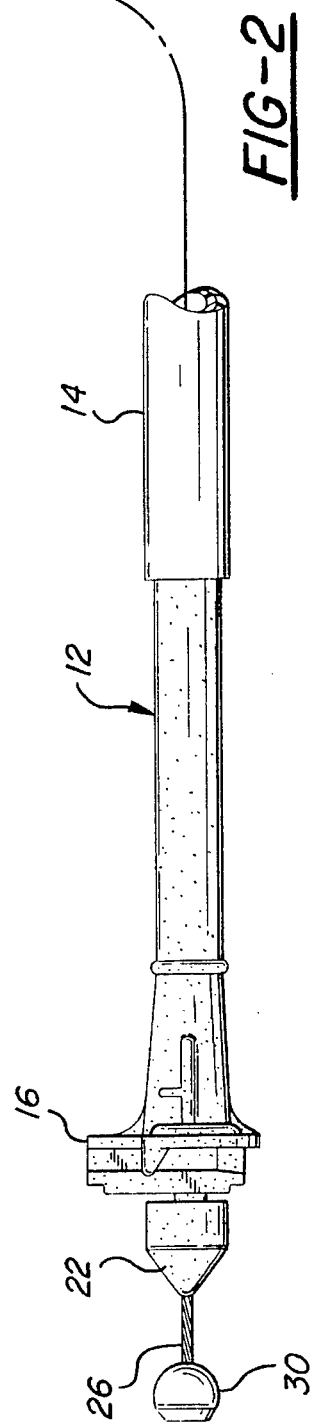

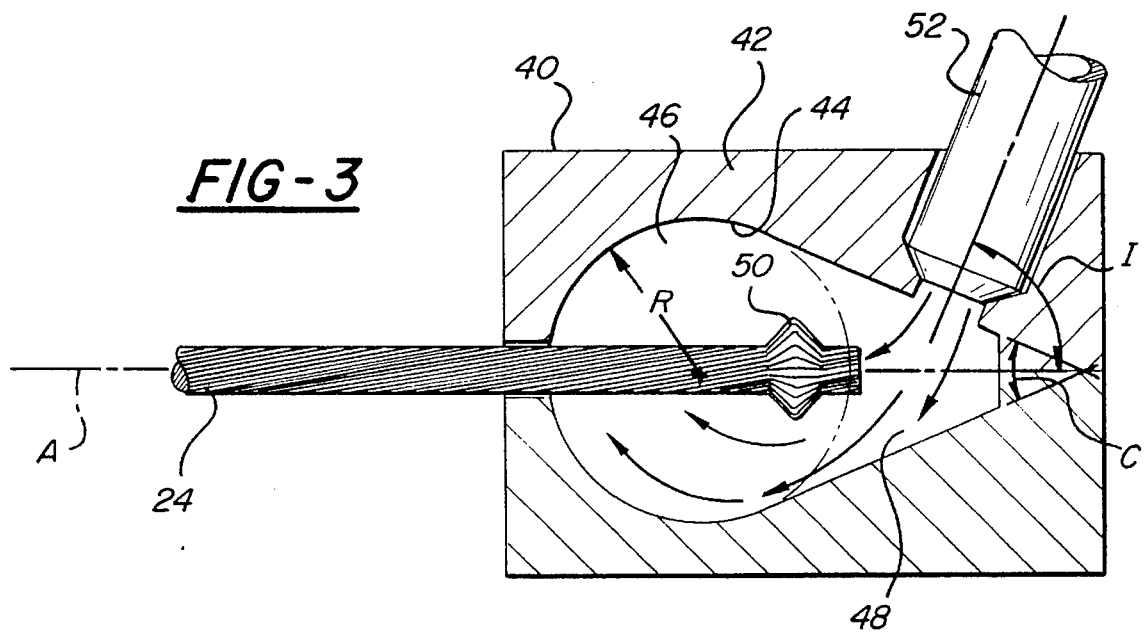
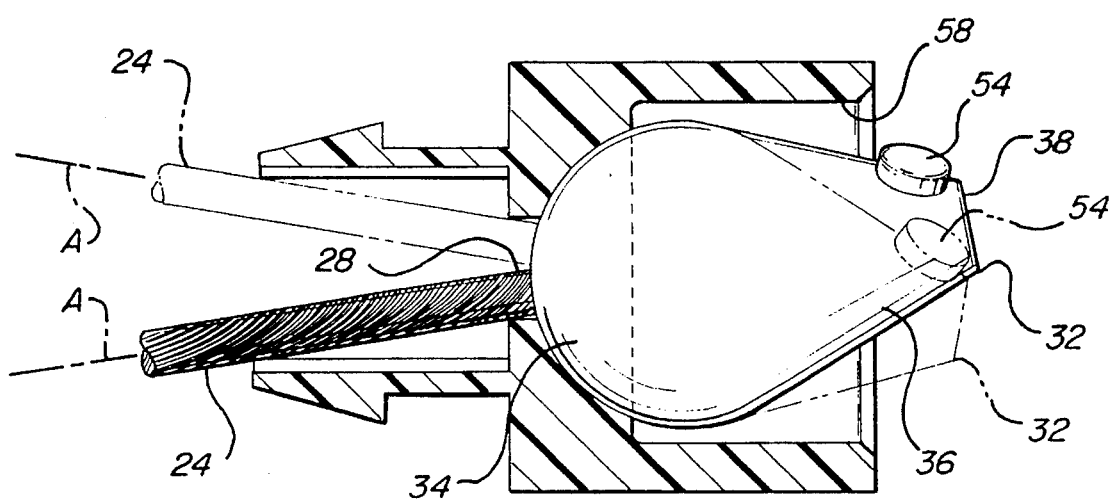

5,493,934

TEARDROP SHAPE SLUG FOR CABLE ASSEMBLY

TECHNICAL FIELD

The subject invention relates to a motion transmitting remote control cable assembly of the type for transmitting tensile forces along a curved path, and more particularly to an improved slug construction formed on the end of the core element.

BACKGROUND OF THE INVENTION

Motion transmitting remote control cable assemblies of the type for transmitting forces along a curved path are often employed in the automotive industry to manually control such features as acceleration, cruise control, transmission shifting, ventilation, braking, clutching, etc. Some applications, e.g., transmission shift control, require the motion transmitting core element to carry both compressive and tensile loads. In other applications, such as accelerator and clutch control, require only tensile force transmission. In this latter case, it is well known to form a slug on the end of the core element for convenient connection to either a controlled or a controlling device. For example, U.S. Pat. No. 4,624,155 to Wing, issued Nov. 25, 1986, discloses a remote control assembly having slugs at each end connected between a brake pedal and the brake linkages. Also, as shown in U.S. Pat. No. 5,165,298 to Shier et al, issued Nov. 24, 1992, a slug is formed on the end of a core element for simple connection to a throttle cam.

Such slugs are typically formed from zinc in a die casting operation where a pair of die halves defining a slug forming die cavity therebetween are clamped about the end of a core element. A segment of the core element located within the die cavity is frequently upset in some manner, such as by bending or fanning, to increase adhesion with the molten zinc. A sprue located along the axis of the core element injects molten zinc into the die cavity and around the upset portion of the core element. After the zinc has solidified, the core element with the attached slug is removed from the die casting assembly for either further assembly or use.

As shown in the Shier et al '298 patent, as well as in U.S. Pat. No. 4,088,040 to Ross-Myring, issued May 9, 1978, it is often desirable to form the slug with a spherically rounded head to permit free swiveling articulation between the slug and the attached control device. In these instances, the slug is usually formed with a generally spherically shaped head portion truncated at its tail, or base, end where a sprue adjoined the die cavity, thus leaving a flattened sprue scare. So long as the head portion remains spherically rounded, the flattened tail formed by the sprue scar does not hamper swiveling articulation between the slug and the control device.

When a tensile force transmitting remote control cable assembly of the type described above is fabricated, it is usually the case that a core element is first cut to length and a slug molded on one end thereof. The molding of this first slug is not a tolerance critical operation because the finished length of the cable assembly, i.e., from head to head of the slugs on each end, has not yet been established. Therefore, after the first slug is die cast onto the first end of the cable, the remaining cable assembly components are installed, such as the conduit, grommets, retention sockets, etc. Then, a final operation forms a second slug onto the second end of the core element, which then holds the various components together and prevents inadvertent disassembly. The second slug must be exactly positioned on the core element to establish a critical dimensioned length, referred to as the gauge measure, between the head of the first slug and the head of the second slug.

According to prior art technology where slugs having spherically rounded heads are formed in a mold, a sprue injects liquid zinc directly, i.e., axially, on the end of the core element in the die cavity. It is frequently the case that the core element is displaced axially under the pressure of the zinc injection by one or two millimeters out of the die cavity, thereby inadvertently lengthening the gauge measure of the cable assembly once the second slug is formed. Such inadvertent axial displacement of the core element out from the die cavity is not consistent from one slug formation to the next, and thereby prevents precise and calculable tolerances in the gauge measure of the final assembly. Further, such inadvertent axial displacement of the core element out from the die cavity during injection of the zinc can result in the upset portion of the core element becoming located very near to the surface of the spherically rounded head. This phenomena can have several disadvantages, the most important of which are an increased tendency for core element pull out from the slug and premature failure due to exposure or shallowness of the fatigued and stressed upset portion of the cable assembly.

SUMMARY OF THE INVENTION AND ADVANTAGES

The invention contemplates a motion transmitting remote control cable assembly for transmitting tensile forces between controlling and controlled devices including a tubular conduit, a flexible core element slidable supported in the conduit having first and second spaced ends, and a slug fixedly disposed on one of the first and second ends of the core element for attaching the core element under tension to a control device. The slug has a spherically rounded head and an elongated tail defined by a tapering girth. The improvement comprises a sprue scar disposed along the girth of the tail.

According to another aspect of the invention, a die casting assembly is provided for forming a slug onto the end of a motion transmitting core element for transmitting tensile forces between controlling and controlled devices. The die casting assembly includes a pair of injection die halves joined along a parting plane and defining a slug forming die cavity therebetween. The die cavity has a spherically rounded head forming section and an elongated tail forming section. A flexible core element extends into the die cavity along a longitudinal axis coincidental with the parting plane and generally centered along the head and tail forming sections. The improvement comprises a sprue formed in the die halves along the parting plane and intersectioning the tail forming section along an angle of incidence relative to the longitudinal axis, greater than zero, to decrease axial displacement between the core element and the die cavity during slug formation and to improve adhesion between the core element and the slug.

Yet another aspect of the invention comprises a method for forming a slug onto the end of the motion transmitting core element in a remote control assembly. The method comprises the steps of positioning a core element adjacent one end thereof in a slug forming die cavity along a longitudinal axis, and forming a slug having a spherically rounded head and an elongated tail about the core element by injecting a hardenable liquid material into the die cavity through a sprue. The improvement comprises injecting the hardenable liquid material through the sprue at an angle of incidence relative to the longitudinal axis greater than zero thereby decreasing axial displacement between the core element and the die cavity during the forming and improving adhesion between the core element and the slug.

The slug formed according to the subject invention overcomes the deficiencies and potential disadvantages of the prior art in that the hardenable liquid material, i.e., molten zinc, does not tend to urge the core element out of the forming die cavity otherwise adversely affecting the gauge measure. Instead, molten zinc entering through the sprue into the die cavity swirls in a scooping direction around the core element to create a tenacious bond once the zinc solidifies. Accordingly, dimensional tolerances in the gauge measure of the cable assembly, i.e., from head to head of the slugs formed on each end of the core element, can be maintained at precise and optimum levels. Further, the subject invention permits any upset portion of the core element to remain substantially embedded within the slug, and spaced significantly from the surface of this spherically rounded head, so as to positively eliminate any potential for core element pull out from the slug or premature failure due to exposed or shallow sections of the pre-stressed upset portion.

BRIEF DESCRIPTION OF THE DRAWINGS

Other advantages of the present invention will be readily appreciated as the same becomes better understood by reference to the following detailed description when considered in connection with the accompanying drawings wherein:

FIG. 1 is a perspective view of a slug according to the subject invention shown with a fragment of the core element extending therefrom;

FIG. 2 is a fragmentary side view of a cable assembly having one slug formed according to the subject invention and another slug formed according to the prior art;

FIG. 3 is a side view of a die casting assembly for forming a slug according to the subject invention and including a fragmentary cable assembly positioned therein; and FIG. 4 is a partial cross-sectional view showing a slug according to the subject invention disposed in a retention socket.

DETAILED DESCRIPTION OF THE PREFERRED EMBODIMENT

Referring to the Figures, wherein like numerals indicate like or corresponding parts throughout the several views, a motion transmitting remote control cable assembly of the type for transmitting tensile forces along a curved path is generally shown at 10 in FIG. 2. The assembly 10 includes a flexible tubular conduit, generally indicated at 12. The conduit 12 is of the type having an inner tubular member of organic polymeric material with a plurality of long lay wires wrapped helically about the inner tubular member on a long lead, or a single flat wire wrapped on short lead, and then a casing of organic polymeric materials surrounding the lay wires to form a composite structure resistant to crushing, kinks, abrasion, etc. The conduit 12 may include an additional soft rubber sleeve 14.

Typically, each end of the conduit 12 is provided with an attachment fitting to support the conduit 12 in a routed position in a vehicle. For example, if the cable assembly 10 is of the type for controlling the engine accelerator assembly in an automobile by a foot pedal, the conduit 12 is routed from the engine compartment to the fire wall. In such instances, the support fittings may include a laterally inserted snap fitting 16 which attaches to an engine mounted bracket adjacent the throttle assembly. The opposite end of the conduit 12 may include an axial push-type snap fitting 18 for connection to an opening in the fire wall. A resilient weather seal 20 is typically included at the push fitting 18 to perfect a tight seal against the fire wall. Likewise, a swivel-type wiper cap 22 is used in conjunction with the slide fitting 16 to help seal the conduit 12 against dirt and moisture penetration. Examples of conduit end fittings such as used with this invention may be found in U.S. Pat. Nos. 4,763,541, issued Aug. 16, 1988 and 4,458,552, issued Jul. 10, 1984, both assigned to the assignee of the subject invention, the disclosures of which are hereby incorporated by reference.

The cable assembly 10 also includes a core element 24 of the flexible type. The core element 24 is preferably formed as a cable of multiple helically twisted strands extending between first 26 and second 28 spaced ends. The first end 26 projects outwardly from the conduit 12 adjacent the slide fitting 16, whereas the second end 28 extends from the conduit 12 adjacent the push fitting 18. Thus, in the example of the cable assembly 10 used in an automotive throttle control application, the first end 26 of the core element 24 is connected to the engine throttle assembly and the second end 28 of the core element 24 is connected to the foot operated pedal control. Thus, the foot pedal (not shown) becomes a controlling device and the engine throttle control a controlled device.

To aid retention of the ends 26, 28 of the core element 24 with the various control devices, in instances where the core element 24 is designed to transmit tensile forces only, a slug may be formed on each of the core element ends 26, 28. As shown in FIG. 2, a slug 30 is formed on the first end 26 of the core element 24. The first end slug 30 is of a type and shape well known in the prior art, being die cast from a zinc material in a generally spherical die having a sprue located along the axis of the core element 24. Examples of such prior art slugs may be found in U.S. Pat. No. 5,165,298, issued Nov. 24, 1992, the disclosure of which is hereby incorporated by reference. Such first end slugs 30 can be manufactured in rapid succession on the order of 1,000 to 1,200 per hour, thereby enhancing cost efficiency. During manufacture of the cable assembly 10, it is typical to first cut the raw core element 24 to a given length and form the first end slug 30, and then to thread the core element through the assembled features of the conduit 12. These operations are performed prior to formation of a slug on the second end 28 of the core element 24.

Formation of a slug on the second end 28 of the core element 24 is a more critical operation than formation of the first end slug 30 because the operative length, i.e., gauge measure, of the cable assembly 10 will be established by reference to the distance between the head of the first end slug 30 and the head to be formed by a slug on the second end 28 of the core element 24. If the core element 24 is pushed from or drawn into the die cavity during formation of a slug on the second end 28, the gauge measure of the core element 24 will be inadvertently lengthened or shortened, thereby requiring some adjustment during assembly. Adjustment during assembly is an undesirable time consumption for workers on the assembly line.

According to the subject invention, an improved slug design is formed on the second end 28 of the core element 24 which substantially reduces the potential for axial core element displacement during the forming operation. According to this improvement, a second end slug, generally indicated at 32 in FIGS. 1, 2 and 4, is fixedly disposed on the second end 28 of the core element 24 for attaching the core element 24 under tension to a control device, e.g., a foot operated pedal assembly. The second end slug 32 has a spherically rounded head 34 and an elongated tail 36 defined by a conically tapering, or frustum-shaped, girth. With the core element 24 defining a longitudinal axis A, the spherically rounded head 24 and frustum tail 36 are shown centered along the longitudinal axis A. The tail 36 includes a truncated tip 38.

The shape of the second end slug 32, in conjunction with the die casting technique facilitated by this unique shape, substantially decreases the axial displacement of the core element 24 during the second end slug 32 formation process and further improves adhesion between the core element 24 and the second end slug 32. A die casting assembly for forming the second end slug 32 onto the end of the core element 24 is shown in FIG. 3. A pair of injection die halves 40 are joined along a parting plane 42 and define therebetween a slug forming die cavity 44. The die cavity 44 has a spherically rounded head forming section 46 and an elongated tail forming section 48. The second end 28 of the core element 24 is shown disposed within the die cavity 44, lying along the longitudinal axis A which is generally centered through the head and tail forming sections 46, 48. The head forming section 46 is defined by a radius of curvature R, whose center lies along the longitudinal axis A.

In practice, a radius of curvature R of approximately 4 mm provides satisfactory results, however other dimensions are, of course, possible. The tail forming section 48 tapers conically from a maximum measure adjacent the head forming section 46 to a minimum measure adjacent the truncated tip 38. Preferably, the axial length of the tail forming second 48 is greater than the radius of curvature R, and more particularly in the range of two (2) times the radius of curvature R. For example, if the radius of curvature R equals 4 mm, the length of the tail forming section 48 may be on the order of 8 mm. The conical angle C of the tail forming section 48 may be on the order of 40°, however, those skilled in the art will readily appreciate other possible angles.

To improve adhesion of a slug formed onto the end of the core element, it is well known in the prior art to upset a portion of the core element over which the slug is molded. Examples of such may be found in U.S. Pat. No. 2,484,458 to Brickman, issued Oct. 11, 1949. The upset portion may include an L-shaped or Z-shaped bend, or a bulbous weld created when the core element is cut to length, or even a crimped inner fitting. However, the preferred and most economical method of upsetting a portion of the core element is shown in FIG. 3, wherein a segment of the cable strands forming the core element 24 are fanned and untwisted slightly to form a bird cage-like section 50. This design allows molten zinc to flow inbetween and around each of the fanned cable strands to effect a secure connection once the zinc solidifies. Depending upon the foreseeable tensile loads, although, those skilled in the art will appreciate another advantage of this unique second and slug 32 design in that the extended length of the tail 36 will sometimes an upset portion 50 of the core element to be eliminated.

As mentioned above, it is of particular concern that the gauge measure of, the finished core element 24, i.e., from the head portion of the first end slug 30 to the head 34 of the second end slug 32, be maintained at precise design limits. This requires the formation process of the second end slug 32 to limit axial displacement between the core element 24 and the die cavity 44 during slug formation. To this end, the subject provides a sprue 52 formed between the die halves 40 along the parting plane 42 at a position intersecting the tail forming section 48 along an angle of incidence I relative to the longitudinal axis A, which is greater than zero. In other words, the sprue 52 does not lie along the longitudinal axis A, but instead is inclined at the angle of incidence I and intersects the tail forming section 48 at a strategic location which decreases the tendency for axial displacement between the core element 24 and the die cavity 44 during slug formation, and improves adhesion between the core element 24 and second end slug 32.

Preferably, but not necessarily, the angle of incidence I lies normal to the intersecting portion of the tail forming second 48 which, in the example of 40° given for the conical angle seat, requires the angle of incidence I to equal 70° relative to the longitudinal axis A. The sprue 52 is located adjacent the truncated tip 38 so as to form a flow of molten liquid zinc into the die cavity 44 in a swirling action as shown by the arrows in FIG. 3. As will be readily appreciated by those skilled in the art, as the molten zinc fills the die cavity 44, it begins to cool and thus harden. The last regions of the die cavity 44 to be filled with the molten zinc become the first areas which the zinc solidifies. Thus, as shown by the flow of zinc in FIGS. 3 represented by the arrows, the molten zinc will fully entwine within the bird cage portion 50 of the core element 24 prior to initial solidification within the die cavity 44. This means that hard and fast connections will be formed between the strands of the core element 24 and the zinc prior to its solidification.

As will also be appreciated by those skilled in the art, the angle of incidence I, coupled with the location of the sprue 52 adjacent the truncated tip 38 of the tail forming section 48, will exert very little forwardly acting forces on the second end 28 of the core element 24, thereby substantially decreasing the chances of axial displacement between the core element 24 and the die cavity 44. Therefore, by placing the sprue 52 at an angle of incidence I which is greater than zero relative to the longitudinal axis A, the gauge measure of the finished cable assembly length 10 is maintained at precise design limits.

As shown in FIGS. 1, 2 and 4, the formed second end slug 32 will include a sprue scar disposed along the girth of the tail 36. The sprue scar 54 is disposed proximal the truncated tip 38 and extends somewhat proud of the frustum tail 36. However, various control of the formation process or of a later finishing operation may leave the sprue scar 54 substantially flush with the surface of the tail 36. A primary advantage of the unique shape of the second end slug 32, however, permits the sprue scar 54 to stand proud of the tail 36 while still permitting free swiveling movement in a retention socket 56, such as that shown in FIG. 4. The retention socket 56 shown in FIGS. 2 and 4 allows convenient snap connection to a flat metal plate carried on the rear side of a foot pedal (not shown). The frustum shape of the tail 36 does not obstruct or limit swiveling movement of the second end slug 32 within the retention socket 56, even given the confining wall extension 58 and the proud sprue scar 54.

The invention has been described in an illustrative manner, and it is to be understood that the terminology which has been used is intended to be in the nature of words of description rather than of limitation.

Obviously, many modifications and variations of the present invention are possible in light of the above teach-

What is claimed is:

1. A motion transmitting remote control cable assembly of the type for transmitting tensile forces between controlling and controlled devices, said assembly comprising: a tubular conduit (12); a flexible core element (24) slidably supported in said conduit (12) and having first (26) and second (28) spaced ends; a slug (32) fixedly disposed on one of said first (26) and second (28) ends of said core element (24) for attaching said core element (24) under tension to a control device, said slug (32) having a sphericly rounded head (34) and an elongated tail (36) defined by a tapering girth; and characterized by a sprue scar (54) disposed along said girth of said tail (36).

2. An assembly as set forth in claim 1 wherein said sphericly rounded head (34) is defined by a radius curvature (R), said tail (36) having a length (L) greater than said radius of curvature (R).

3. An assembly as set forth in claim 2 wherein said core element (24) defines a longitudinal axis (A) through said slug (32), said tail (36) having a frustum shape centered along said longitudinal axis (A).

4. An assembly as set forth in claim 3 wherein said tail (36) includes a truncated tip (38), said sprue scar (54) disposed proximal said truncated tip (38).

5. An assembly as set forth in claim 4 wherein said sprue scar (54) extends proud of said tail (36).

6. An assembly as set forth in claim 4 wherein said core element (24) comprises a cable of multiple helically twisted strands.

7. An assembly as set forth in claim 6 wherein said core element (24) includes an upset portion (50) embedded within said slug (32).

8. An assembly as set froth in claim 7 wherein said upset portion (50) comprises a fanned and untwisted segment of said cable strands.

* * * * *